US012682503B2

(12) United States Patent (10) Patent No.: US 12,682,503 B2
Graziosi et al. (45) Date of Patent: Jul. 14, 2026

(54) MESH SEGMENTATION

(71) Applicants: SONY GROUP CORPORATION,
Tokyo (JP); **Sony Corporation of
America,** New York, NY (US)

(72) Inventors: Danillo Graziosi, Flagstaff, AZ (US);
Alexandre Zaghetto, San Jose, CA
(US); Ali Tabatabai, Cupertino, CA
(US)

(73) Assignee: SONY GROUP CORPORATION,
Tokyo (JP)

( * ) Notice: Subject to any disclaimer, the term of this
patent is extended or adjusted under 35
U.S.C. 154(b) by 200 days.

(21) Appl. No.: 18/394,062

(22) Filed: Dec. 22, 2023

(65) Prior Publication Data

US 2025/0022179 A1 Jan. 16, 2025

Related U.S. Application Data

(60) Provisional application No. 63/513,493, filed on Jul.
13, 2023.

(51) Int. Cl.
*G06T 9/00* (2006.01)
*G06F 18/2431* (2023.01)
*G06T 7/11* (2017.01)
*G06T 7/187* (2017.01)
*G06T 17/20* (2006.01)

(52) U.S. Cl.
CPC .......... *G06T 9/001* (2013.01); *G06F 18/2431*
(2023.01); *G06T 7/11* (2017.01); *G06T 7/187*
(2017.01); *G06T 17/205* (2013.01); *G06T
2207/20081* (2013.01)

(58) Field of Classification Search
CPC ... G06F 18/2431; G06T 17/20; G06T 17/205;
G06T 2207/20081; G06T 7/11; G06T
7/187; G06T 9/001; Y02A 40/81
See application file for complete search history.

(56) References Cited

U.S. PATENT DOCUMENTS

| | | | |
|---|---|---|---|
| 11,340,079 B1 * | 5/2022 | Ebrahimi Afrouzi | ...................... G01C 21/188 |
| 2017/0269709 A1 * | 9/2017 | Yamasaki | .............. G06T 7/248 |
| 2018/0232471 A1 * | 8/2018 | Schissler | ............. G06F 18/2413 |

(Continued)

OTHER PUBLICATIONS

ISO/IEC JTC 1/SC 29/WG7 "V-DMC codec description", MPEG
Meeting; Jul. 17, 2023-Jul. 21, 2023; Geneva; (Motion Picture
Expert Group or ISO/IEC JTC1/SC29/WG11), XP030312004, Retrieved
from the Internet: [retrieved on Oct. 16, 2023].

(Continued)

*Primary Examiner* — Ming Wu
(74) *Attorney, Agent, or Firm* — Haverstock & Owens, A
Law Corporation

(57) ABSTRACT

Described herein is a method to segment meshes into
sub-meshes based on triangle properties. The triangles are
first classified according to some characteristic using their
respective areas. A filtering process may change the classi-
fication according to the neighboring triangles. Then con-
nected components are generated, and neighboring con-
nected components are merged following a certain criteria.
In some embodiments, connected components that share the
most amount of edges are merged. With this technique,
sub-meshes can be automatically generated without any
previous knowledge of the mesh generation stage.

15 Claims, 7 Drawing Sheets

(56) References Cited

U.S. PATENT DOCUMENTS

2019/0279423 A1*  9/2019  Murray .................. G06F 30/00
2020/0302692 A1*  9/2020  Li .......................... G06T 17/205

OTHER PUBLICATIONS

Graziosi et al: "[V-CG] Sony's Dynamic Mesh Coding Call for Proposal Response", MPEG Meeting; Online; (Motion Picture Expert Group or ISO/IEC JTC1/SC29/WG11), No. m59284, Mar. 25, 2022, XP030300727, Retrieved from the Internet: [retrieved on Mar. 25, 2022].

Graziosi et al: "[VDMC-NEW] orthoAtlas: a new texture mapping proposal for V-DMC". MPEG Meeting; Oct. 24, 2022-Oct. 28, 2022; Mainz; (Motion Picture Expert Group or ISO/IEC JTC1/SC29/WG11), No. m60982, XP030305374, Retrieved from the Internet: [retrieved on Oct. 19, 2022].

Graziosi, Aet al. , "[V-DMC][EE4.11] New Mesh Segmentation Based on Triangle Area, International Organisation for Standardisation Organisation Internationale de Normalisation ISO/IEC JTC 1/SC 29/WG 7 Coding of Moving Pictures and Audio ISO/IEC JTC 1/SC 29/WG 7 m64504", Jul. 14, 2023 (Jul. 14, 2023), pp. 1-5, XP093189052. Retrieved from the Internet: [retrieved on Jul. 24, 2024].

Graziosi et al: "[V-PCC] [EE2. 6-related] Mesh Patch Data", MPEG Meeting; Oct. 12, 2020-Oct. 16, 2020; Online; (Motion Picture Expert Group or ISO/IEC JTC1/SC29/WG11), No. m55368, XP030292889, Retrieved from the Internet: [retrieved on Oct. 7, 2020].

* cited by examiner

202

200

502

500

MESH SEGMENTATION

CROSS-REFERENCE TO RELATED APPLICATION(S)

This application claims priority under 35 U.S.C. § 119(e) of the U.S. Provisional Patent Application Ser. No. 63/513, 493, filed Jul. 13, 2023 and titled, "MESH SEGMENTA-TION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

Described herein is a method to segment meshes into sub-meshes based on triangle properties. The triangles are first classified according to some characteristic using their respective areas. A filtering process may change the classification according to the neighboring triangles. Then connected components are generated, and neighboring connected components are merged following a certain criteria. In some embodiments, connected components that share the most amount of edges are merged. With this technique, sub-meshes can be automatically generated without any previous knowledge of the mesh generation stage.

In one aspect, a method programmed in a non-transitory memory of a device comprises classifying triangles within a mesh based on a triangle characteristic into a classification of a plurality of classifications, changing the classification of a triangle when the triangle is determined to be an isolated triangle, generating connected components of the triangles that are connected and are in a same classification and merging neighboring connected components to generate a sub-mesh. The method further comprises expanding each sub-mesh by adding one or more triangles at a border of the sub-mesh such that the sub-meshes overlap. The triangle characteristic is a triangle area. The classification of the plurality of classifications comprises a first classification when the triangle area is equal to or greater than a threshold, and the classification of the plurality of classifications comprises a second classification when the triangle area is less than the threshold. The threshold is user-generated. The threshold is generated using artificial intelligence and machine learning. The threshold is adjusted per frame or per sequence. The determination that the triangle is an isolated triangle is based on comparing the classification of the triangle with the classification of neighboring triangles, and if the classification of the triangle is different from the classification of all of the neighboring triangles, then the triangle is the isolated triangle. The method further comprises tracking the mesh and using mesh segmentation from a previous frame for a current frame.

In another aspect, an apparatus comprises a non-transitory memory for storing an application, the application for: classifying triangles within a mesh based on a triangle characteristic into a classification of a plurality of classifications, changing the classification of a triangle when the triangle is determined to be an isolated triangle, generating connected components of the triangles that are connected and are in a same classification and merging neighboring connected components to generate a sub-mesh and a processor coupled to the memory, the processor configured for processing the application. The application is further configured for expanding each sub-mesh by adding one or more triangles at a border of the sub-mesh such that the sub-meshes overlap. The triangle characteristic is a triangle area. The classification of the plurality of classifications comprises a first classification when the triangle area is equal to or greater than a threshold, and the classification of the plurality of classifications comprises a second classification when the triangle area is less than the threshold. The threshold is user-generated. The threshold is generated using artificial intelligence and machine learning. The threshold is adjusted per frame or per sequence. The determination that the triangle is an isolated triangle is based on comparing the classification of the triangle with the classification of neighboring triangles, and if the classification of the triangle is different from the classification of all of the neighboring triangles, then the triangle is the isolated triangle. The application is further configured for tracking the mesh and using mesh segmentation from a previous frame for a current frame.

In another aspect, a system comprises an encoder configured for encoding content and a decoder configured for: classifying triangles within a mesh based on a triangle characteristic into a classification of a plurality of classifications, changing the classification of a triangle when the triangle is determined to be an isolated triangle, generating connected components of the triangles that are connected and are in a same classification and merging neighboring connected components to generate a sub-mesh. The decoder is further configured for expanding each sub-mesh by adding one or more triangles at a border of the sub-mesh such that the sub-meshes overlap. The triangle characteristic is a triangle area. The classification of the plurality of classifications comprises a first classification when the triangle area is equal to or greater than a threshold, and the classification of the plurality of classifications comprises a second classification when the triangle area is less than the threshold. The threshold is user-generated. The threshold is generated using artificial intelligence and machine learning. The threshold is adjusted per frame or per sequence. The determination that the triangle is an isolated triangle is based on comparing the classification of the triangle with the classification of neighboring triangles, and if the classification of the triangle is different from the classification of all of the neighboring triangles, then the triangle is the isolated triangle. The decoder is further configured for tracking the mesh and using mesh segmentation from a previous frame for a current frame.

DETAILED DESCRIPTION OF THE PREFERRED EMBODIMENT

Meshes are composed of a set of polygons usually describing a surface of a volume. Recently, the V3C standard, an international standard for encoding of volumetric objects using video compression, has been published. The new V-DMC standard extends the V3C standard for dynamic meshes. Additionally, the meshes can be divided into sub-meshes and coded independently. Usually, when generating dynamic meshes, areas with more details have a higher concentration of triangles to improve surface description, and those particular areas can have their own mesh segment for improved encoding. However, this segmentation information might not always be available, so described herein is a method to identify the areas with high triangle concentration, and meaningfully segment the mesh without any previous knowledge of the mesh generation stage.

Described herein is a method to segment meshes into sub-meshes based on triangle properties. The triangles are first classified according to some characteristic using their respective areas. A filtering process may change the classification according to the neighboring triangles. Then connected components are generated, and neighboring connected components are merged following a certain criteria. In some embodiments, connected components that share the most amount of edges are merged. With this technique, sub-meshes can be automatically generated without any previous knowledge of the mesh generation stage.

The coding of meshes using sub-meshes includes mesh segmentation. Mesh generation usually uses smaller triangles to describe high-resolution features, such as a person's face or hands. However, simply segmenting a mesh according to the triangle dimensions may not work, because smaller triangles in non-meaningful areas that were used to just generate the surface of the mesh may be encountered. A method that divides the mesh according to the triangle's property is described herein, but the method ensures at the same time some regularity in the sub-mesh surfaces.

Figure 1:
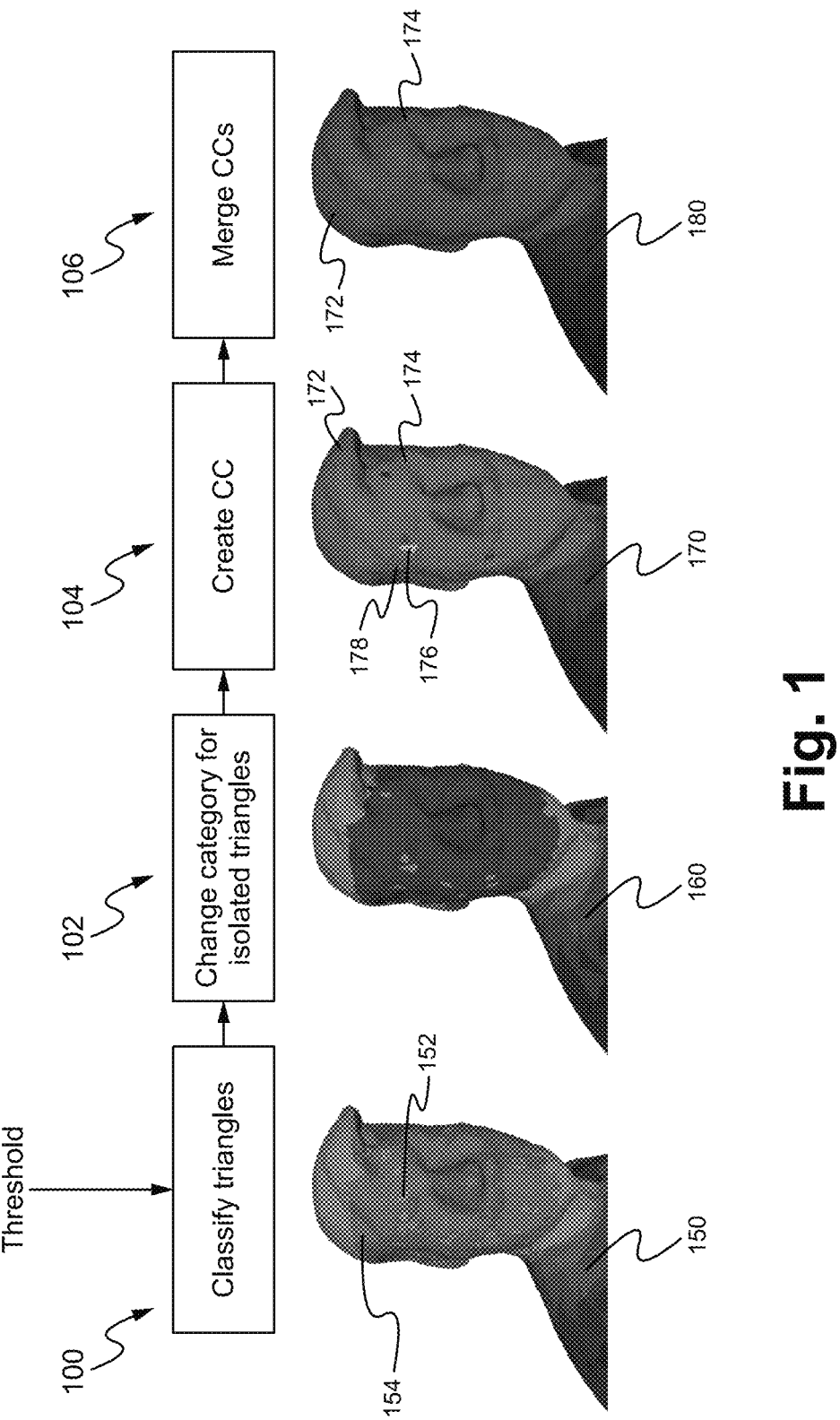
FIG. 1 illustrates a flowchart of a method of mesh segmentation according to some embodiments.

FIG. 1 illustrates a flowchart of a method of mesh segmentation according to some embodiments. In the step 100, triangles are classified by area. For example, triangles with an area equal to or larger than a threshold are classified in a first classification/category (e.g., large triangle classification), and triangles with an area smaller than the threshold are classified in a second classification/category (e.g., small triangle classification). Furthering the example, Triangle 1 has an area of 110, Triangle 2 has an area of 44 and Triangle 3 has an area of 132, and with a threshold of 100, Triangles 1 and 3 are classified in a first classification (Class A/large triangle), and Triangle 2 is classified in a second classification (Class B/large triangle). As shown in image 150, Class A triangles 152 are large triangles, and Class B triangles 154 are small triangles. The Class A triangles 152 are mostly in the hair, neck and body, while the Class B triangles 154 are mostly in the face. As shown, there are some Class A triangles 152 in the face surrounded by Class B triangles 154, and some Class B triangles 154 in the hair and body surrounded by Class A triangles 152.

The threshold to determine which classification each triangle is classified as is able to be determined, adjusted or optimized per frame or per sequence. For example, for Frame 0, the threshold is 105, for Frame 1 the threshold is 99, and so on. In some embodiments, the threshold is determined manually (e.g., input by a user) or automatically. In some embodiments, the threshold is adjusted using Artificial Intelligence (AI) and/or Machine Learning (ML). For example, using AI/ML, a device learns if the threshold is generating appropriate classifications which provide optimal results (e.g., fewer isolated triangles or more accurate results). In some embodiments, the learning is based on a user reviewing computer-generated thresholds and providing feedback. In another example, the distribution of triangles is able to be analyzed, and a threshold is able to be determined based on the distribution (e.g., based on the mean or median of the distribution). In another example, a clustering algorithm or other algorithm (e.g., Otsu's method, maximization expectation) is used to determine/optimize the threshold.

In the step 102, the classification of isolated triangles is changed. For example, if a Class B triangle is surrounded by Class A triangles, then the Class B triangle is changed to a Class A triangle. Determination that a triangle of one classification is surrounded by triangles of another classification is able to be performed in any manner such as comparing neighboring triangles (e.g., determining which triangles share a vertex and/or an edge with a triangle) by comparing classifications of each of the triangles. If the classification of the triangle is different from all of the neighboring triangles, then the classification of the triangle is changed to be the same as the neighboring triangles. As shown in image 160, the classification of the isolated triangles has been changed. Image 160 still has some triangles that appear to be misclassified (e.g., some large triangles remaining in the face) because they are two or more Class A triangles 152 together that are surrounded by Class B triangles 154 and thus not isolated triangles.

In the step 104, connected components (e.g., sub-meshes) are generated according to the connectivity and the classification. For example, if several neighboring triangles have the same classification, a connected component is able to be generated with the triangles. Image 170 shows various connected components 172, 174, 176 and 178.

In the step 106, neighboring connected components are merged/combined. For example, as neighboring or related connected components are determined to be of the same classification, the connected components are able to be combined. For example, in image 170, the neighbors of the connected component 176 are compared with the connected component 174 since the connected component 174 surrounds the connected 176. Since the connected component 174 is Class B 152 and surrounds the connected component 176, then the connected component 176 is merged with the connected component 174. The merged connected components retain the classification of the larger connected component (e.g., connected component 174). Connected component 178 is similar to connected component 176 and is merged with connected component 174. For connected components on the border of two larger connected components (e.g., where the face meets the hair or where the face meets the neck), an implementation is able to decide which larger connected component to merge with. For example, an implementation is able to alternate which larger connected component a smaller connected component merges with.

In some embodiments, the connected components are combined until only two connected components remain (e.g., a face and a body). Image 180 shows the two remaining connected components 172 and 174.

In some embodiments, fewer or additional steps are implemented. For example, in some embodiments, to allow overlapping, the sub-meshes are able to be expanded by adding triangles at the border such that the sub-meshes overlap each other. In some embodiments, the order of the steps is modified.

In some embodiments, instead of or in addition to using area for classification, one or more other triangle properties are used (e.g., triangle edge sizes). In some embodiments, an initial classification is performed (e.g., using triangle edge sizes), and then another classification is performed (e.g., triangle area).

In some embodiments, if a mesh is tracked, then the mesh segmentation from the previous frame is utilized for the current frame. In some embodiments, instead of using only two classifications, additional classifications are implemented (e.g., three classifications-face, hands, body) by using multiple thresholds (e.g., above the first threshold is body, between the first threshold and the second threshold is hands, and below the second threshold is face). In some embodiments, more mesh segmentation is able to be performed based on the triangle area (e.g., to generate sub-meshes for the hands). For example, instead of merging all of the connected components of the body together into one sub-mesh, the connected component merging stops at a certain size or other threshold such that the hands are a separate sub-mesh from the body sub-mesh. In some embodiments, instead of using triangle area for the initial segmentation, the normal direction of each triangle is used. The mesh is segmented according to the normal phase, and all of the parts of the body pointing toward the forward facing camera are grouped and all the parts of the body pointing toward the back facing camera are grouped.

Figure 2:
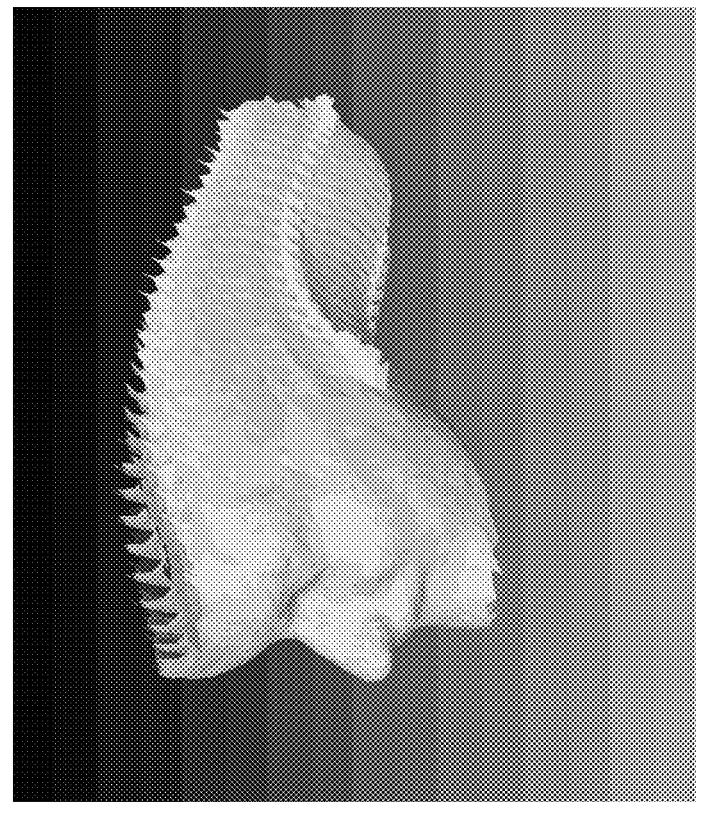
FIG. 2 illustrates exemplary connected components according to some embodiments.
Figure 2:
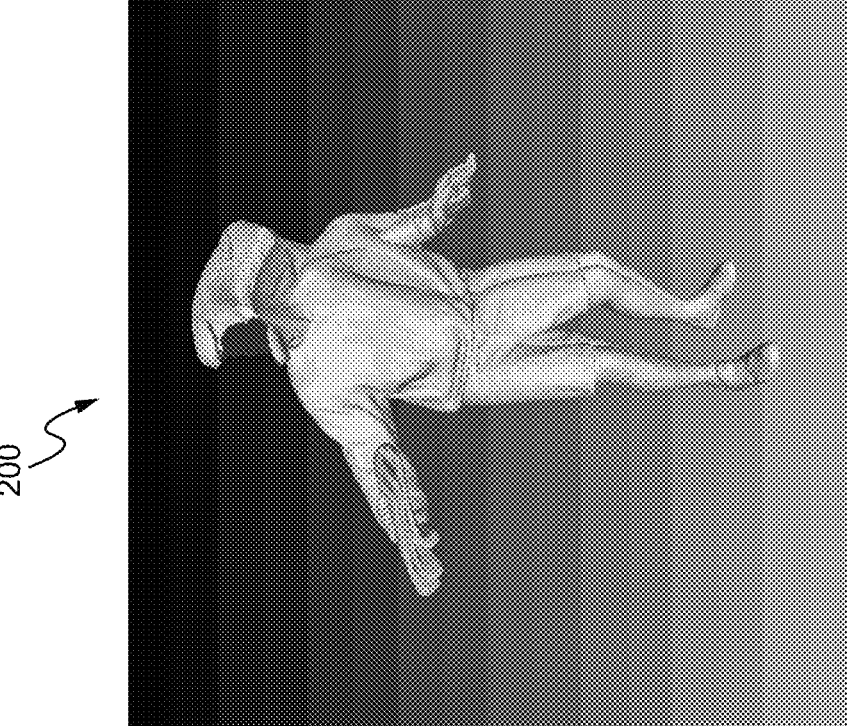

FIG. 2 illustrates exemplary connected components according to some embodiments. Since the example is a movie sequence, there are 32 frames shown. Image 200 shows the connected components for the body which includes the larger triangles (e.g., Class A). Image 202 shows the connected components for the face which includes the smaller triangles (e.g., Class B). Each slice is a frame.

Figure 3:
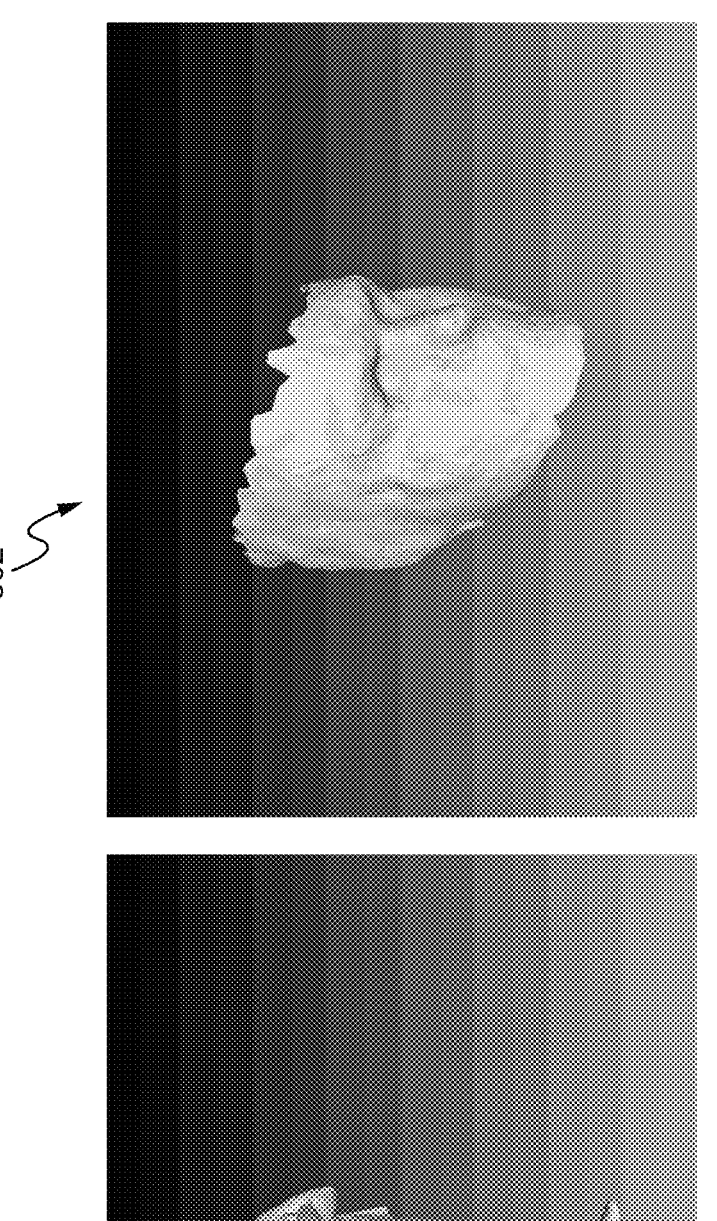
FIG. 3 illustrates exemplary connected components according to some embodiments.

FIG. 3 illustrates exemplary connected components according to some embodiments. Image 300 shows the connected components for the body which includes the larger triangles (e.g., Class A). Image 302 shows the connected components for the face which includes the smaller triangles (e.g., Class B).

Figure 4:
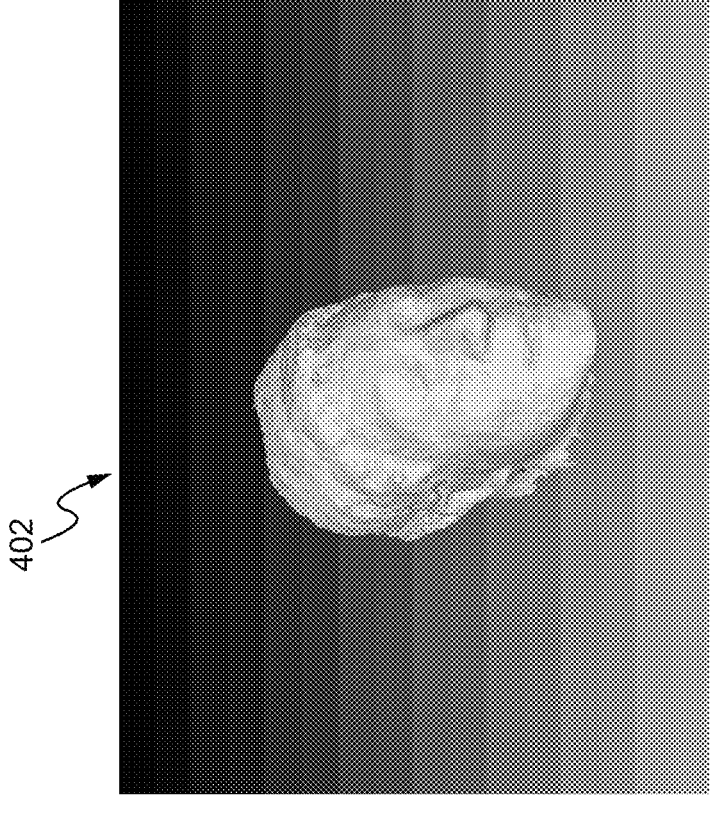
FIG. 4 illustrates exemplary connected components according to some embodiments.
Figure 4:
Figure 4:
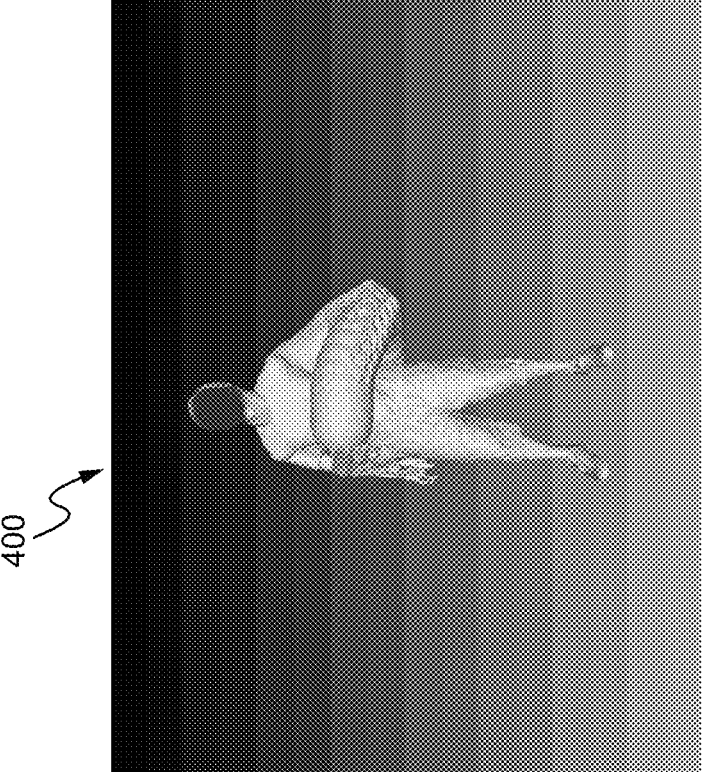

FIG. 4 illustrates exemplary connected components according to some embodiments. Image 400 shows the connected components for the body which includes the larger triangles (e.g., Class A). Image 402 shows the connected components for the face which includes the smaller triangles (e.g., Class B).

Figure 5:
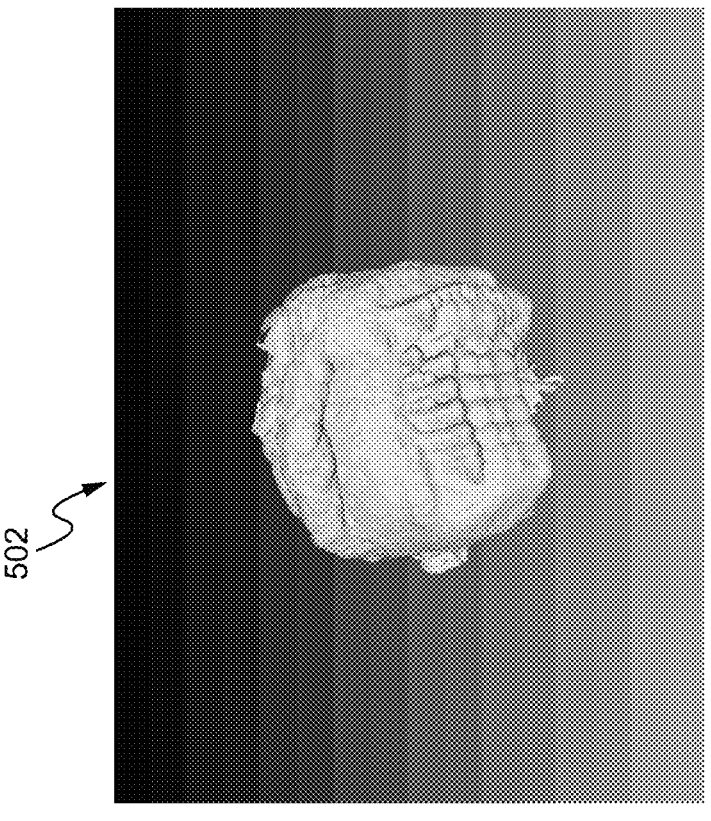
FIG. 5 illustrates exemplary connected components according to some embodiments.
Figure 5:
Figure 5:
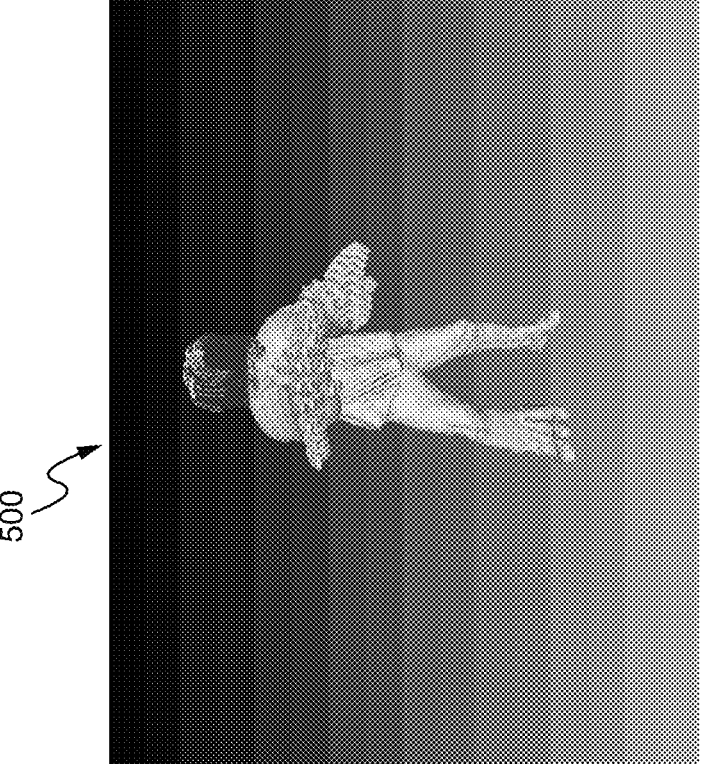

FIG. 5 illustrates exemplary connected components according to some embodiments. Image 500 shows the connected components for the body which includes the larger triangles (e.g., Class A). Image 502 shows the connected components for the face which includes the smaller triangles (e.g., Class B).

Figure 6:
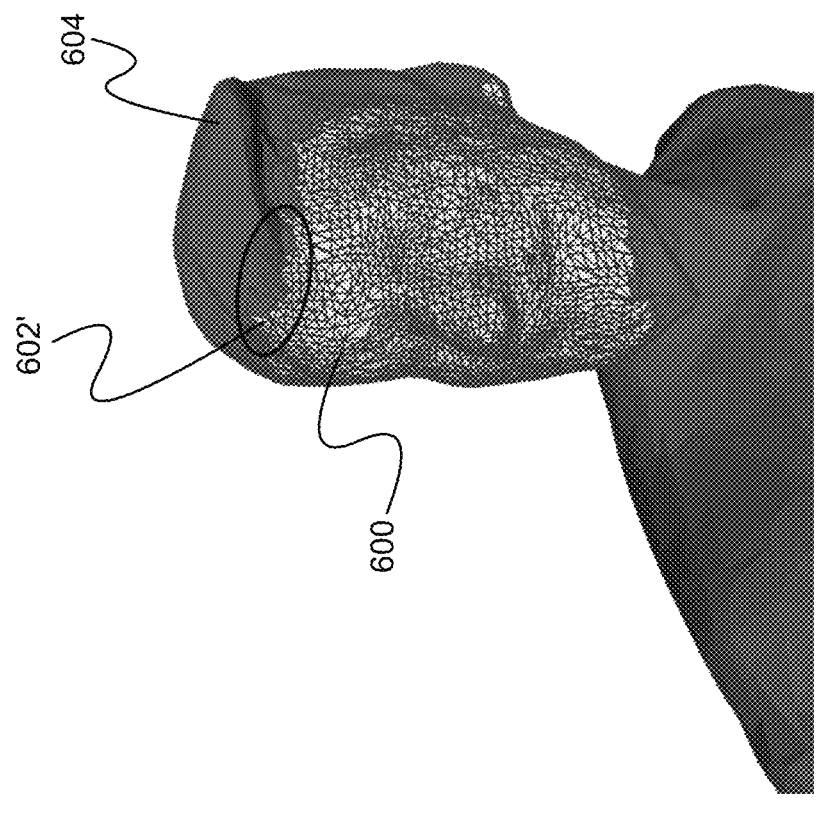
FIG. 6 illustrates exemplary images of overlap of sub-meshes according to some embodiments.
Figure 6:
Figure 6:
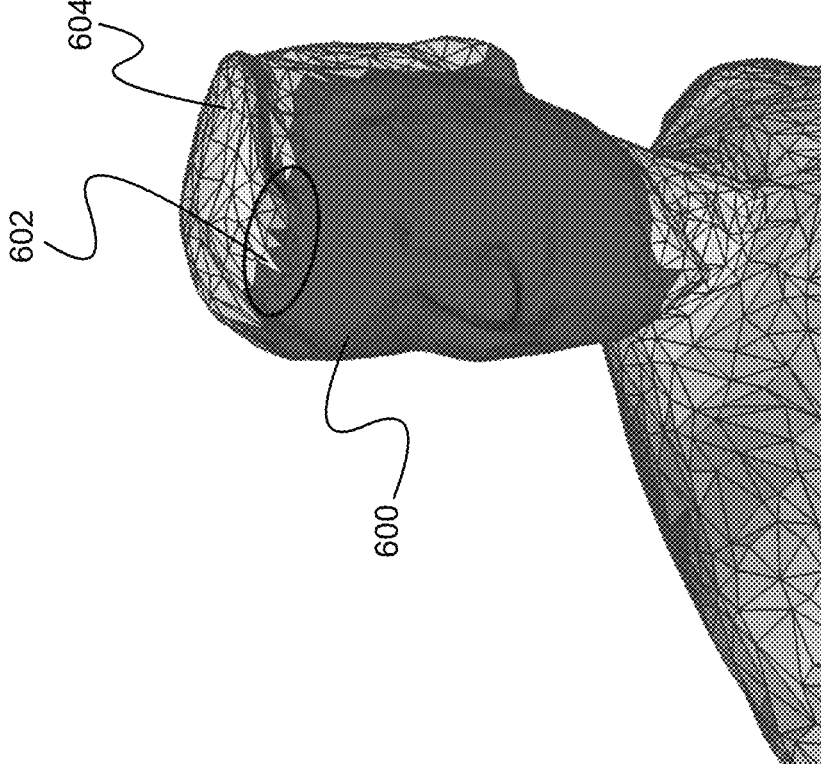

FIG. 6 illustrates exemplary images of overlap of sub-meshes according to some embodiments. A first sub-mesh 600 adds triangles 602 from a second sub-mesh 604. For example, a triangle from the second sub-mesh 604 is duplicated and added to the first sub-mesh 600. Similarly, triangles 602' from the first sub-mesh 600 are duplicated and added to the second sub-mesh 604. By duplicating the triangles and adding them to each sub-mesh, there is an overlap between the two sub-meshes.

Figure 7:
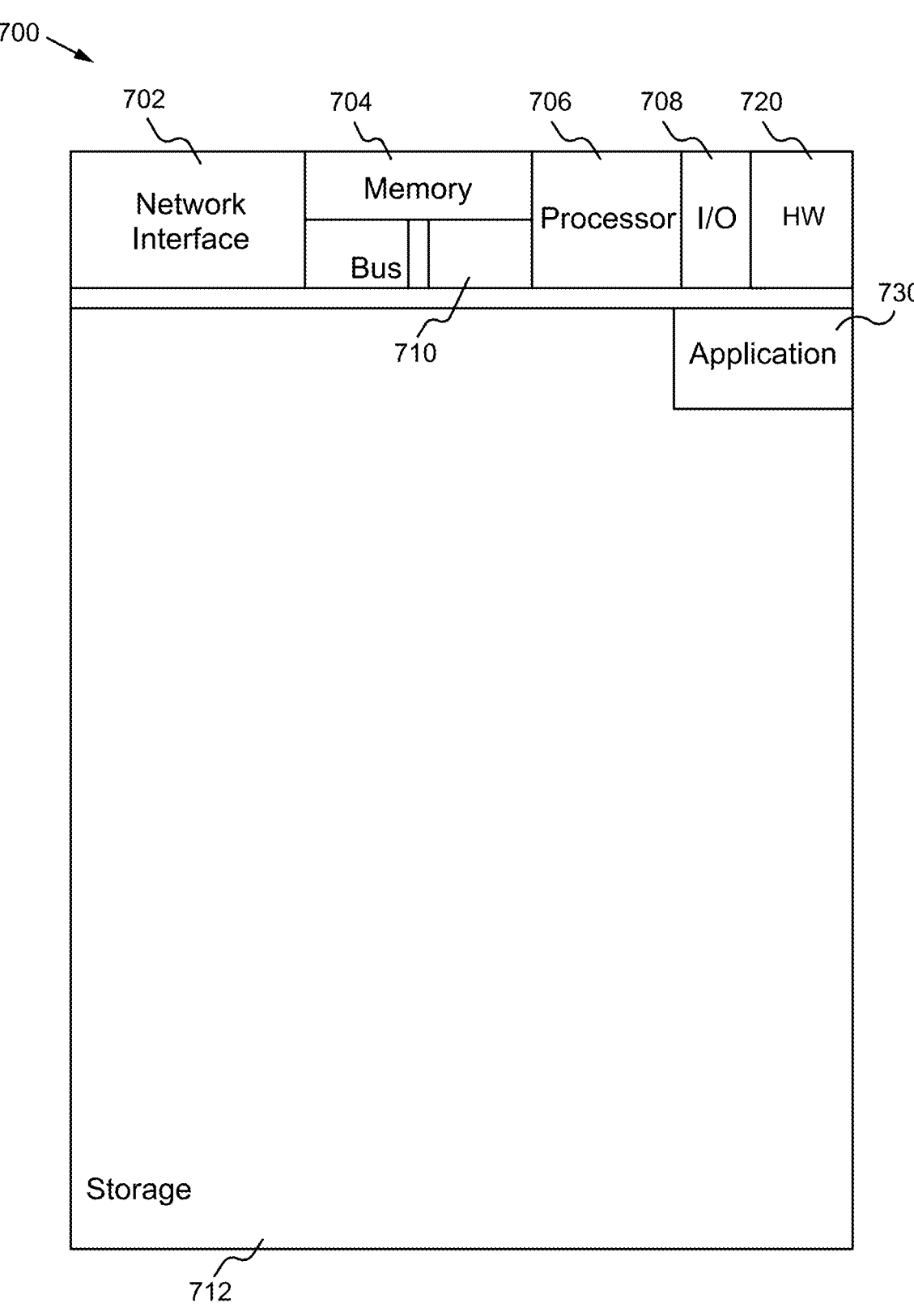
FIG. 7 illustrates a block diagram of an exemplary computing device configured to implement the mesh segmentation method according to some embodiments.

FIG. 7 illustrates a block diagram of an exemplary computing device configured to implement the mesh segmentation method according to some embodiments. The computing device 700 is able to be used to acquire, store, compute, process, communicate and/or display information such as images and videos including 3D content. The computing device 700 is able to implement any of the encoding/decoding aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Mesh segmentation application(s) 730 used to implement the mesh segmentation implementation are likely to be stored in the storage device 712 and memory 704 and processed as applications are typically processed. More or fewer components shown in FIG. 7 are able to be included in the computing device 700. In some embodiments, mesh segmentation hardware 720 is included. Although the computing device 700 in FIG. 7 includes applications 730 and hardware 720 for the mesh segmentation implementation, the mesh segmentation method is able to be implemented on a computing device in hardware, firmware, software or any combination thereof. For example, in some embodiments, the mesh segmentation applications 730 are programmed in a memory and executed using a processor. In another example, in some embodiments, the mesh segmentation hardware 720 is programmed hardware logic including gates specifically designed to implement the mesh segmentation method.

In some embodiments, the mesh segmentation application(s) 730 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh segmentation method, a device acquires or receives 3D content (e.g., point cloud content). The mesh segmentation method is able to be implemented with user assistance or automatically without user involvement.

In operation, the mesh segmentation method results in a more detailed face with fewer artifacts.

Some Embodiments of Mesh Segmentation

1. A method programmed in a non-transitory memory of a device comprising:
   classifying triangles within a mesh based on a triangle characteristic into a classification of a plurality of classifications;
   changing the classification of a triangle when the triangle is determined to be an isolated triangle;
   generating connected components of the triangles that are connected and are in a same classification; and
   merging neighboring connected components to generate a sub-mesh.
2. The method of clause 1 further comprising expanding each sub-mesh by adding one or more triangles at a border of the sub-mesh such that the sub-meshes overlap.

3. The method of clause 1 wherein the triangle characteristic is a triangle area.
4. The method of clause 3 wherein the classification of the plurality of classifications comprises a first classification when the triangle area is equal to or greater than a threshold, and the classification of the plurality of classifications comprises a second classification when the triangle area is less than the threshold.
5. The method of clause 4 wherein the threshold is user-generated.
6. The method of clause 4 wherein the threshold is generated using artificial intelligence and machine learning.
7. The method of clause 4 wherein the threshold is adjusted per frame or per sequence.
8. The method of clause 1 wherein the determination that the triangle is an isolated triangle is based on comparing the classification of the triangle with the classification of neighboring triangles, and if the classification of the triangle is different from the classification of all of the neighboring triangles, then the triangle is the isolated triangle.
9. The method of clause 1 further comprising tracking the mesh and using mesh segmentation from a previous frame for a current frame.
10. An apparatus comprising:
    a non-transitory memory for storing an application, the application for:
       classifying triangles within a mesh based on a triangle characteristic into a classification of a plurality of classifications;
       changing the classification of a triangle when the triangle is determined to be an isolated triangle;
       generating connected components of the triangles that are connected and are in a same classification; and
       merging neighboring connected components to generate a sub-mesh; and
    a processor coupled to the memory, the processor configured for processing the application.
11. The apparatus of clause 10 wherein the application is further configured for expanding each sub-mesh by adding one or more triangles at a border of the sub-mesh such that the sub-meshes overlap.
12. The apparatus of clause 10 wherein the triangle characteristic is a triangle area.
13. The apparatus of clause 12 wherein the classification of the plurality of classifications comprises a first classification when the triangle area is equal to or greater than a threshold, and the classification of the plurality of classifications comprises a second classification when the triangle area is less than the threshold.
14. The apparatus of clause 13 wherein the threshold is user-generated.
15. The apparatus of clause 13 wherein the threshold is generated using artificial intelligence and machine learning.
16. The apparatus of clause 13 wherein the threshold is adjusted per frame or per sequence.
17. The apparatus of clause 10 wherein the determination that the triangle is an isolated triangle is based on comparing the classification of the triangle with the classification of neighboring triangles, and if the classification of the triangle is different from the classification of all of the neighboring triangles, then the triangle is the isolated triangle.

18. The apparatus of clause 10 wherein the application is further configured for tracking the mesh and using mesh segmentation from a previous frame for a current frame.

19. A system comprising:
an encoder configured for encoding content; and
a decoder configured for:
classifying triangles within a mesh based on a triangle characteristic into a classification of a plurality of classifications;
changing the classification of a triangle when the triangle is determined to be an isolated triangle;
generating connected components of the triangles that are connected and are in a same classification; and
merging neighboring connected components to generate a sub-mesh.

20. The system of clause 19 wherein the decoder is further configured for expanding each sub-mesh by adding one or more triangles at a border of the sub-mesh such that the sub-meshes overlap.

21. The system of clause 19 wherein the triangle characteristic is a triangle area.

22. The system of clause 21 wherein the classification of the plurality of classifications comprises a first classification when the triangle area is equal to or greater than a threshold, and the classification of the plurality of classifications comprises a second classification when the triangle area is less than the threshold.

23. The system of clause 22 wherein the threshold is user-generated.

24. The system of clause 22 wherein the threshold is generated using artificial intelligence and machine learning.

25. The system of clause 22 wherein the threshold is adjusted per frame or per sequence.

26. The system of clause 19 wherein the determination that the triangle is an isolated triangle is based on comparing the classification of the triangle with the classification of neighboring triangles, and if the classification of the triangle is different from the classification of all of the neighboring triangles, then the triangle is the isolated triangle.

27. The system of clause 19 wherein the decoder is further configured for tracking the mesh and using mesh segmentation from a previous frame for a current frame.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
classifying triangles within a mesh based on a triangle characteristic into a classification of a plurality of classifications, wherein the triangle characteristic is a triangle area, wherein the classification of the plurality of classifications comprises a first classification when the triangle area is equal to or greater than a threshold, and the classification of the plurality of classifications comprises a second classification when the triangle area is less than the threshold, wherein the threshold is generated using artificial intelligence and machine learning;
changing the classification of a triangle when the triangle is determined to be an isolated triangle, wherein the determination that the triangle is an isolated triangle is based on comparing the classification of the triangle with the classification of neighboring triangles, and if the classification of the triangle is different from the classification of all of the neighboring triangles, then the triangle is the isolated triangle;
generating connected components of the triangles that are connected and are in a same classification; and
merging neighboring connected components to generate a sub-mesh.

2. The method of claim 1 further comprising expanding each sub-mesh by adding one or more triangles at a border of the sub-mesh such that the sub-meshes overlap.

3. The method of claim 1 wherein the threshold is user-generated.

4. The method of claim 1 wherein the threshold is adjusted per frame or per sequence.

5. The method of claim 1 further comprising tracking the mesh and using mesh segmentation from a previous frame for a current frame.

6. An apparatus comprising:
a non-transitory memory for storing an application, the application for:
classifying triangles within a mesh based on a triangle characteristic into a classification of a plurality of classifications, wherein the triangle characteristic is a triangle area, wherein the classification of the plurality of classifications comprises a first classification when the triangle area is equal to or greater than a threshold, and the classification of the plurality of classifications comprises a second classification when the triangle area is less than the threshold, wherein the threshold is generated using artificial intelligence and machine learning;
changing the classification of a triangle when the triangle is determined to be an isolated triangle, wherein the determination that the triangle is an isolated triangle is based on comparing the classification of the triangle with the classification of neighboring triangles, and if the classification of the triangle is different from the classification of all of the neighboring triangles, then the triangle is the isolated triangle;
generating connected components of the triangles that are connected and are in a same classification; and
merging neighboring connected components to generate a sub-mesh; and
a processor coupled to the memory, the processor configured for processing the application.

7. The apparatus of claim 6 wherein the application is further configured for expanding each sub-mesh by adding one or more triangles at a border of the sub-mesh such that the sub-meshes overlap.

8. The apparatus of claim 6 wherein the threshold is user-generated.

9. The apparatus of claim 6 wherein the threshold is adjusted per frame or per sequence.

10. The apparatus of claim 6 wherein the application is further configured for tracking the mesh and using mesh segmentation from a previous frame for a current frame.

11. A system comprising:
an encoder configured for encoding content; and
a decoder configured for:

classifying triangles within a mesh based on a triangle characteristic into a classification of a plurality of classifications, wherein the triangle characteristic is a triangle area, wherein the classification of the plurality of classifications comprises a first classification when the triangle area is equal to or greater than a threshold, and the classification of the plurality of classifications comprises a second classification when the triangle area is less than the threshold, wherein the threshold is generated using artificial intelligence and machine learning;

changing the classification of a triangle when the triangle is determined to be an isolated triangle, wherein the determination that the triangle is an isolated triangle is based on comparing the classification of the triangle with the classification of neighboring triangles, and if the classification of the triangle is different from the classification of all of the neighboring triangles, then the triangle is the isolated triangle;

generating connected components of the triangles that are connected and are in a same classification; and merging neighboring connected components to generate a sub-mesh.

12. The system of claim 11 wherein the decoder is further configured for expanding each sub-mesh by adding one or more triangles at a border of the sub-mesh such that the sub-meshes overlap.

13. The system of claim 11 wherein the threshold is user-generated.

14. The system of claim 11 wherein the threshold is adjusted per frame or per sequence.

15. The system of claim 11 wherein the decoder is further configured for tracking the mesh and using mesh segmentation from a previous frame for a current frame.

* * * * *